United States Patent [19]

Dymond

[11] 4,410,058
[45] Oct. 18, 1983

[54] VEHICLE STEERING APPARATUS

[75] Inventor: Richard W. Dymond, Rochester, Mich.

[73] Assignee: TRW Inc., Cleveland, Ohio

[21] Appl. No.: 329,219

[22] Filed: Dec. 10, 1981

[51] Int. Cl.³ .............................................. B62D 5/08
[52] U.S. Cl. ..................................... 180/143; 60/463; 60/468; 137/594
[58] Field of Search .................. 180/143, 142; 60/463, 60/468; 137/594, 595

[56] References Cited

U.S. PATENT DOCUMENTS

| | | | |
|---|---|---|---|
| 2,791,287 | 5/1957 | Stolte | 180/143 |
| 3,744,515 | 7/1973 | Inoue | 137/494 |
| 3,902,320 | 9/1975 | Marietta | 60/445 |
| 4,000,785 | 1/1977 | Nishikawa et al. | 180/143 |
| 4,085,817 | 4/1978 | Kervagoret | 60/468 |
| 4,119,172 | 10/1978 | Yanagishima et al. | 180/141 |
| 4,274,504 | 6/1981 | Kawabata et al. | 180/143 |

FOREIGN PATENT DOCUMENTS 52-41325  3/1977  Japan ..................... 180/143

*Primary Examiner*—John A. Pekar
*Assistant Examiner*—D. Lynn Fugate
*Attorney, Agent, or Firm*—Yount & Tarolli

[57] ABSTRACT

An improved power steering apparatus includes a pressure modulation assembly which modulates the fluid pressure transmitted from a power steering control valve to a power steering motor. The modulation assembly varies the fluid pressure output from the steering control valve as a direct function of vehicle speed. This results in relatively easy steering for parking and low speed maneuvers and a firmer feel for maneuvers at higher speeds. The pressure modulation assembly is connected in series fluid communication with and between the power steering control valve and the power steering motor and includes a pair of pressure modulation valves. Fluid for actuating the power steering motor flows from the power steering control valve through the pressure modulation valves to the power steering motor. The pressure modulation valves are biased closed by the output pressure from an auxiliary pump which is driven at a speed which varies as a function of vehicle speed. Thus, the pressure of the fluid delivered to the power steering motor is reduced by the pressure modulation valve to an extent determined by the magnitude of the biasing force derived from the speed dependent auxiliary pump.

6 Claims, 7 Drawing Figures

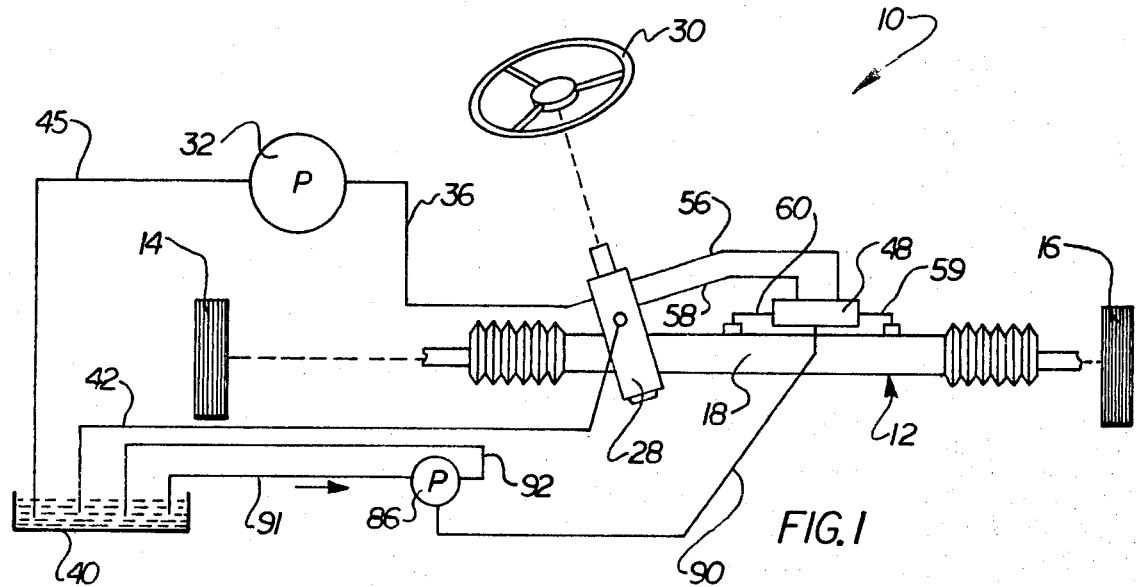
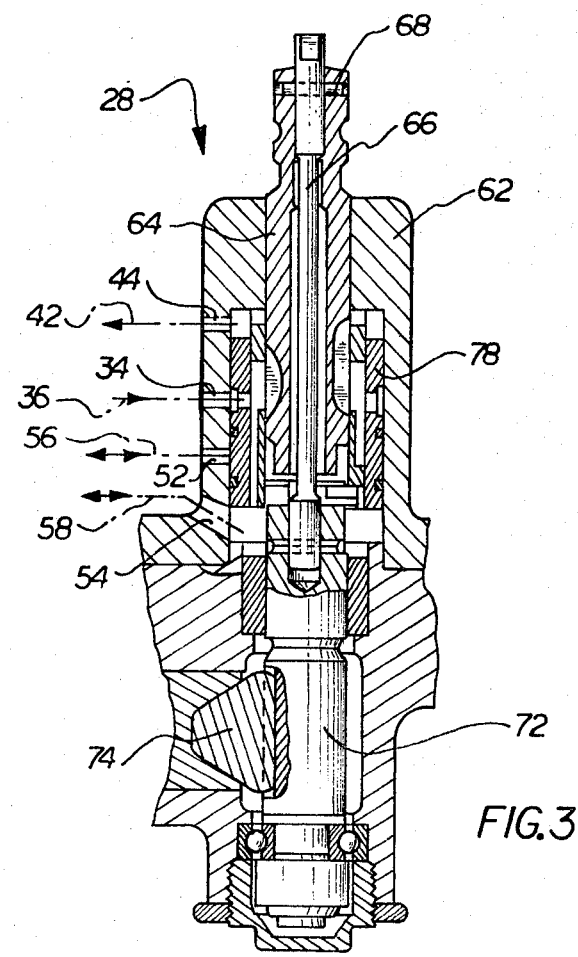
FIG. 1
FIG. 3

VEHICLE STEERING APPARATUS

BACKGROUND OF THE INVENTION

This invention relates generally to a vehicle steering apparatus and more specifically to a power steering apparatus in which, as vehicle speed increases, the feel of the steering apparatus approximates the feel of a non-power assisted steering apparatus.

Many known vehicle power steering systems reduce the effort required to turn the steering wheel of a vehicle during parking and low speed maneuvers. In order to maximize the operator's feel of control over the vehicle during high speed operation, attempts have been made to increase the effort required to turn the steering wheel at high speeds so that the power steering system tends to approximate the feel of a non-power assisted steering system. Thus, U.S. Pat. No. 4,119,172 discloses a power steering system in which, at high speeds, an electrically actuated valve reduces the fluid pressure delivered to a steering control valve. This results in a reduction in the power-assist at relatively high vehicle speeds. Since the fluid pressure being delivered to the power steering valve is being reduced, there is a danger that an adequate supply of fluid may not be quickly available for emergency steering manuevers. Other patents disclosing the concept of providing higher steering effort at increased speeds are U.S. Pat. Nos. 2,791,287; 3,744,515; 3,902,320; and 4,000,785.

SUMMARY OF THE PRESENT INVENTION

The present invention provides a new and improved apparatus for use in turning steerable vehicle wheels. The apparatus includes a power steering motor which is connected with steerable vehicle wheels and is operable to effect turning movement of these wheels. Manual actuation of a control valve directs fluid to the power steering motor.

In order to enhance operator feel during operation of the vehicle at high speeds, a pressure modulation assembly is connected in series fluid communication with the power steering control valve and power steering motor. Fluid from the power steering control valve flows through the pressure modulation assembly to the power steering motor, and fluid discharged from the power steering motor flows through the pressure modulation assembly to the power steering valve. The pressure modulation assembly reduces the pressure of the fluid delivered to the power steering motor to an extent which varies as a function of vehicle speeed. This increases the torque or force which must be applied to the power steering control valve by an operator of the vehicle to actuate the valve to obtain a given fluid pressure at the steering motor as the vehicle speed increases. Since the pressure modulation assembly is located between the power steering valve and the motor, adequate fluid flow is available for a quick response to emergency conditions.

Accordingly, it is an object of this invention to provide a new and improved apparatus which is used in turning steerable vehicle wheels and in which a pressure modulation assembly connected in series fluid communication with and between a power steering control valve and a power steering motor to reduce the pressure of the fluid delivered from the control valve to the motor to an extent which varies as a function of vehicle speed.

BRIEF DESCRIPTION OF THE DRAWINGS

The foregoing and other objects and features of the present invention will become more apparent upon a consideration of the following description taken in connection with the accompanying drawings wherein:

FIG. 1 is a schematic illustration of a vehicle steering apparatus constructed in accordance with the present invention;

FIG. 3 is a sectional view illustrating the construction of a known power steering control valve used in the apparatus of FIG. 1;

DESCRIPTION OF ONE SPECIFIC PREFERRED EMBODIMENT OF THE INVENTION

Steering Apparatus—General

Figure 2:
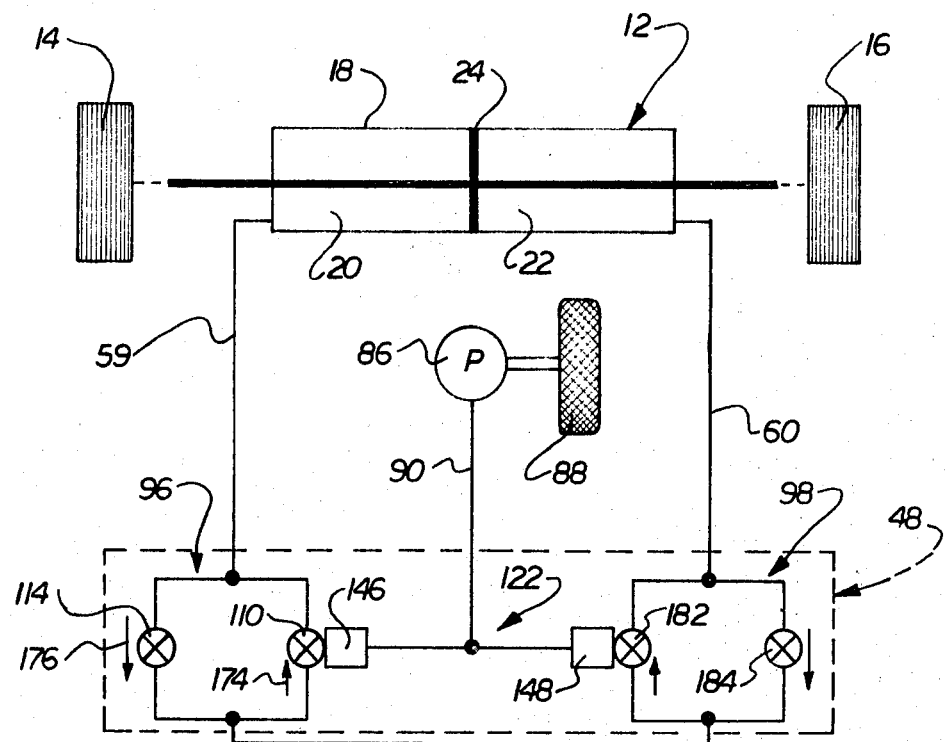
FIG. 2 is a schematic illustration of hydraulic circuitry used in the vehicle steering apparatus of FIG. 1 and illustrating the manner in which a pressure modulation assembly is connected in series fluid communication with a power steering control valve and a power steering motor.

A power steering apparatus 10 constructed in accordance with the present invention is illustrated in FIGS. 1 and 2. The power steering apparatus 10 includes a power steering motor 12 which is connected to steerable vehicle wheels 14 and 16 in a known manner. The power steering motor 12 includes a cylinder 18 which is divided into a pair of variable volume chambers 20 and 22 (FIG. 2) by a piston 24.

A power steering control valve 28 is manually actuated, by rotating a steering wheel 30, to direct fluid pressure to either the variable volume chamber 20 or the variable volume chamber 22 of the power steering motor 12. The power steering control valve 28 receives fluid at a substantially constant flow rate from an engine driven main pump 32 which is connected with an inlet port 34 (FIG. 3) of the power steering control valve 28 by a conduit 36. The fluid pressure output from the power steering control valve 28 varies as a function of the extent of actuation of the valve and is independent of vehicle speed.

When the power steering control valve 28 is in an unactuated condition, fluid flows through the power steering control valve to a reservoir or drain 40 through a conduit 42 which is connected with an outlet port 44 (FIG. 3) of the control valve. Fluid is supplied to the pump 32 from the reservoir 40 through a conduit 45. Actuation of the power steering control valve 28 restricts fluid flow to the outlet port 44 and directs fluid flow to one of the motor ports 52 and 54. The extent to which fluid flow to the outlet port 44 is restricted and fluid flow and pressure directed to one of the motor ports 52 and 54 varies as a direct function of the extent of actuation of the control valve and is independent of vehicle speed.

The power steering control valve 28 is connected in fluid communication with the motor 12 through a pressure modulation assembly 48. Thus, the motor ports 52 and 54 (FIG. 3) are connected with the pressure modulation assembly 48 by conduits 56 and 58 (see FIGS. 1 and 2). The pressure modulation valve assembly 48 is connected with the power steering motor 12 by conduits 59 and 60.

The power steering control valve 28 is of a known construction and includes a housing 62 in which a rotatable valve spool 64 (see FIG. 3) is mounted. The valve spool 64 is connected at one end with a torsion rod or bar 66 by a pin 68. The opposite end of the torsion bar 66 is connected with a pinion gear 72 which is disposed in meshing engagement with a rack gear 74. The rack gear 74 is connected with the power steering motor piston 24 for movement therewith during turning movement of the steerable vehicle wheels 14 and 16. As the steering wheel 30 is rotated, the relative motion between the valve spool 64 and the valve sleeve 78 directs fluid flow to the power steering motor 12 and steerable vehicle wheels 14 and 16 are turned to the extent of rotation of the steering wheel 30.

It should be understood that the power steering control valve 28 of FIG. 3 is well known and is described and illustrated in more detail in U.S. Pat. No. 3,709,099. It should also be understood that the present invention is not limited to a specific power steering control valve or to a specific valve and steering motor arrangement. For example, a power steering control valve and motor arrangement similar to the one shown in U.S. Pat. No. 3,921,669 could be used if desired.

In accordance with a feature of the present invention, the pressure modulation assembly 48 (FIGS. 1 and 2) modifies the fluid pressure output from the control valve 28 to make the power steering system 10 feel more like a non-power assisted steering system when a vehicle is traveling at highway speeds. When the vehicle is being parked or is traveling at very low speeds, the pressure modulation assembly 48 is relatively ineffective and power steering motor 12 minimizes the steering effort required to turn the steerable vehicle wheels 14 and 16. Thus, the pressure modulation assembly 48 cooperates with the power steering control valve 28 and power steering motor 12 to reduce the steering effort required for parking and low speed maneuvers while increasing the steering effort required at higher vehicle speeds to provide better steering feel.

To accomplish the foregoing result, the pressure modulation assembly 48 reduces the fluid pressure transmitted from the power steering control valve 28 to the power steering motor 12 to an extent which increases as vehicle speed increases. Thus at very low vehicle speeds, such as during parking maneuvers, the pressure modulation assembly 48 effects a minimal reduction in the fluid pressure transmitted from the power steering control valve 28 to the power steering motor 12. However at relatively high vehicle speeds, the pressure modulation assembly 48 effects a substantial reduction in the fluid pressure transmitted from the power steering control valve 28 to the power steering motor 12 to provide a firmer feel. In other words, the operator of the vehicle will have a feel which approximates the feel of driving a vehicle having a non-power assisted steering system.

The pressure modulation assembly 48 is connected in series fluid communication with the power steering control valve 28 and power steering motor 12 (see FIG. 2). Therefore, the pressure modulation assembly 48 receives and acts directly upon the output from the power steering control valve 28. This enables the pressure modulation assembly 48 to vary the fluid pressure transmitted to the power steering motor 12 quickly and efficiently with variations in vehicle speed. The pressure modulation assembly 48 also receives the fluid exhausted from the power steering motor 12 and directs the fluid to flow back to the power steering control valve 28 with a minimum of interference.

To enable the pressure modulation assembly 48 to respond to changes in vehicle speed, an auxiliary pump 86 is driven by a vehicle wheel 88 or other direct means at a speed which varies as a direct function of vehicle speed. Therefore, the fluid from the auxiliary pump 86 passes through an orifice (not shown) which results in fluid output pressure varying as a direct function of vehicle speed. The fluid pressure output from the auxiliary pump 86 is transmitted to the pressure modulation assembly 48 through a conduit 90 (see FIGS. 1 and 2). During a power steering maneuver, the output pressure from the main pump 32 is greater than the output pressure from the auxiliary pump 86. However, when the power steering control valve 28 is in a neutral or unactuated condition, the fluid output from the main pump 32 is bypassed to reservoir through the power steering valve 28 and the conduit 42. Therefore, at this time, the output pressure from the main pump 32 is less than the output pressure from the auxiliary pump 86.

The pump 86 is supplied with fluid from the reservoir 40 through a conduit 91 (FIG. 1). Fluid is returned to the reservoir 40 through a conduit 92. If desired, the reservoir return conduits 42 and 92 for the pumps 32 and 86 could be interconnected.

Pressure Modulation Assembly

The pressure modulation assembly 48 includes a housing 94 (FIG. 4) in which a pair of valve assemblies 96 and 98 are disposed in a coaxial relationship. The valve assembly 96 is connected in series fluid communication with the power steering control valve 28 (see FIG. 2) through the conduit 56 and is connected in series fluid communication with the variable volume chamber 20 of the power steering motor 12 through the fluid conduit 59. Similarly, the valve assembly 98 is connected in series fluid communication with the power steering control valve 28 and motor 12 through conduits 58 and 60 (see FIGS. 2 and 4).

During operation of the power steering motor 12 in a direction to expand the variable volume chamber 20 and contract the variable volume chamber 22, fluid from the power steering control valve 28 is ported by the valve assembly 96 to the variable volume chamber 20 of the fluid motor 12. Fluid exhausted from the contracting variable volume chamber 22 is ported by the other valve assembly 98 to the power steering control valve 28. During turning movement of the steerable vehicle wheels 14 and 16 in the opposite direction so that the variable volume motor chamber 22 is expanded and the chamber 20 contracted, fluid is ported to the power steering motor 12 from the power steering control valve 28 by the valve assembly 98. Fluid exhausted from the motor chamber 20 is ported by the valve assembly 96 to the power steering control valve 28.

The valve assembly 96 (see FIG. 5) performs the dual functions of varying the fluid pressure transmitted from the power steering control valve 28 to the motor 12 with variations in speed during turning movement in one direction and transmitting a flow of fluid discharged from the power steering motor 12 to the control valve 28 during turning movement in the opposite direction. The valve assembly 96 includes a pressure modulation valve 110 through which fluid flows from the power steering control valve to the motor chamber 20 when the motor chamber is expanding. The valve assembly 96 also includes a check valve 114 through which fluid discharged from the motor chamber 20 flows to the power steering control valve 28 when the motor chamber is contracting.

The pressure modulation valve 110 reduces the fluid pressure transmitted from the power steering control valve 28 to the power steering motor 12 by an amount which varies as a direct function of the speed at which the vehicle is moving. The pressure modulation valve 110 includes a spherical ball 118 (FIG. 5) which is pressed into sealing engagement with a circular valve seat 120 by a biasing assembly 122. The biasing assembly 122 is effective to press the ball 118 toward the seat 120 with a force which varies as a function of variations in the pressure at which fluid is discharged from the auxiliary pump 86 (FIG. 2).

Figure 5:
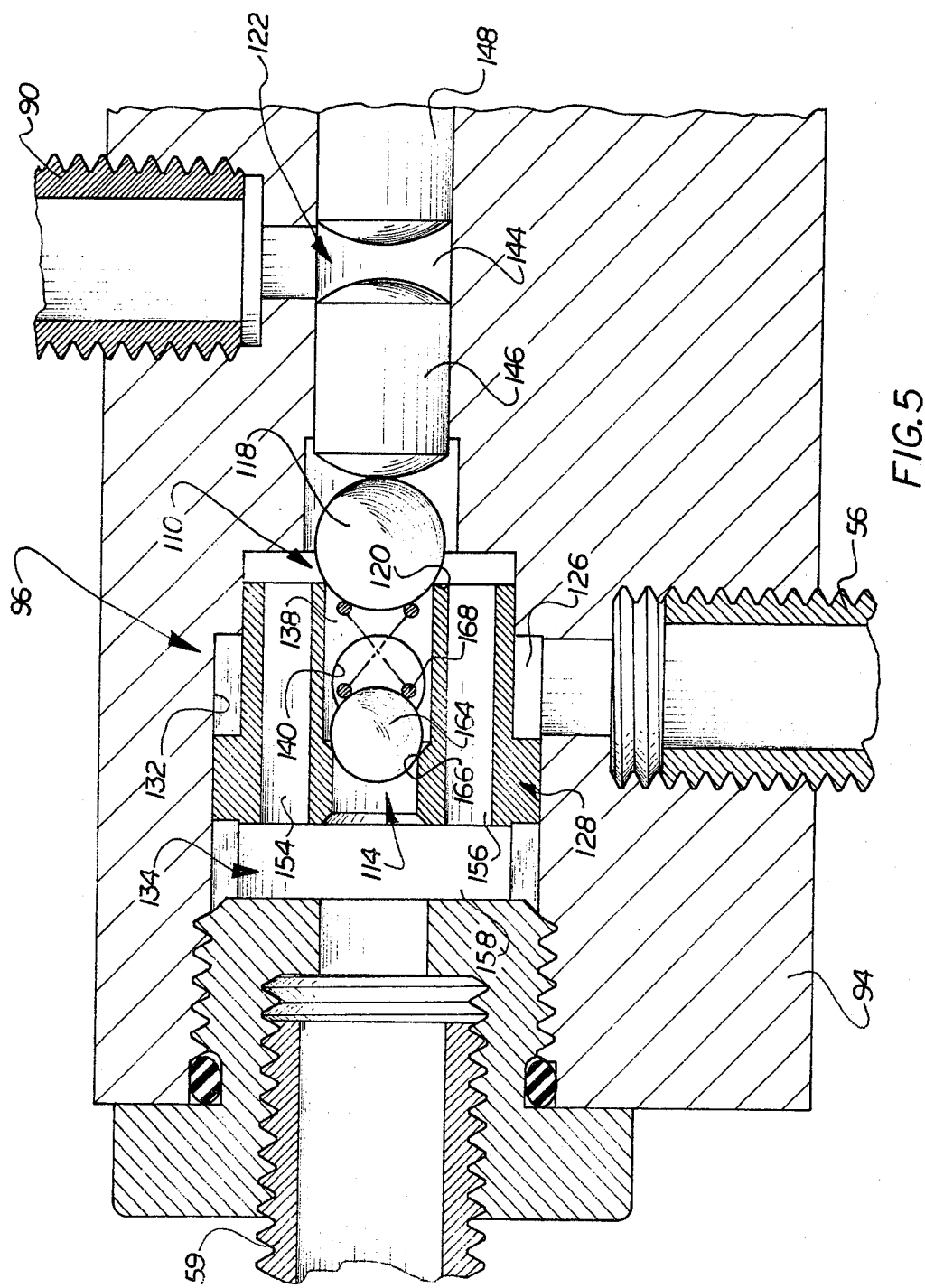
FIG. 5 is an enlarged fragmentary sectional view of a portion of the pressure modulation assembly of FIG. 4.

When the vehicle is being driven, fluid from the power steering control valve 28 is transmitted through the conduit 56 to an annular cavity 126 (FIG. 5) which is disposed between a generally cylindrical sleeve 128 and a side wall 132 of a cavity 134 formed in the housing 94 (FIG. 5). The annular cavity 126 is connected with a control passage 138 in the sleeve 128 through a circular opening 140 in the side wall of the sleeve 128.

At one end, the central passage 138 in the sleeve 128 is closed by the ball 118. As previously described, the ball 118 is biased toward the closed condition shown in FIG. 5 by the biasing assembly 122 with a force which varies as a function of the fluid pressure output from the auxiliary pump 86 (see FIG. 2) and thus as a function of vehicle speed. The fluid pressure from the pump 86 is conducted through the conduit 90 to a cylindrical pressure chamber 144 (FIG. 5) in which a pair of cylindrical pistons 146 and 148 are disposed in a coaxial relationship with the valve assemblies 96 and 98. The fluid pressure forces the piston 146 toward the left (as viewed in FIG. 5) against the ball 118 to press the ball against the valve seat 120. The force with which the piston 146 presses the ball 118 against the valve seat 120 varies as a direct function of vehicle speed.

When the power steering control valve 28 is actuated, the fluid pressure in the central passage 138 will increase as the extent of rotation of the power steering valve spool 64 (FIG. 3) increases relative to the valve sleeve 78. When the power steering control valve 28 has been actuated to a sufficient extent, the fluid pressure in the passage 138 moves the ball 118 toward the right (as viewed in FIG. 5) against the biasing force applied to the ball by the piston 146. This occurs when the output pressure from the control valve 28 is greater than the output pressure from the auxiliary pump 86.

As the ball 118 moves to an open condition (FIG. 6), fluid can flow between the ball and the valve seat 120 (FIG. 5). At this time, the ball 118 and valve seat 120 cooperate to define an orifice. The size of the orifice and the fluid pressure drop across the orifice is proportional to the biasing force applied against the ball 118 by the piston 146. The fluid flow through the orifice between the ball 118 and valve seat 120 enters passages 154 and 156 that extend through the sleeve 128 from one end to the other. The fluid then flows from passages 154 and 156 into an end portion 158 of the cavity 134 opposite the ball 118. From the cavity 134, the fluid flows out through the conduit 59 which is connected in fluid communication with the variable volume motor chamber 20.

The fluid pressure communicated to the variable volume motor chamber 20 is less than the fluid pressure output from the power steering control valve 28 by an amount equal to the pressure drop across the annular orifice between the ball 118 and valve seat 120. The greater the biasing force applied against the ball 118 by the piston 146, the smaller will be the orifice and the greater will be the pressure drop across the orifice. Since the biasing force applied against the ball valve 118 by the piston 146 varies as a direct function of vehicle speed, the amount by which the output pressure from the power steering control valve 28 is reduced by the pressure modulating valve 110 varies directly with vehicle speed.

When the power steering control valve 28 is actuated to turn in the opposite direction, the variable volume motor chamber 22 is expanded and the chamber 20 is contracted. This results in fluid being discharged from the motor chamber 20 through the conduit 59 (see FIG. 2) to the valve assembly 96 in the pressure modulation assembly 48. The fluid discharged from the motor 12 opens the check valve 114 and flows to the power steering control valve 28 through the conduit 56.

The check valve 114 includes a ball 164 located in the central passage 138 in the sleeve 128. The ball 164 is urged to a closed position against a valve seat 166 by a relatively weak biasing spring 168. Since the biasing spring 168 is relatively weak, the fluid pressure discharged from the motor chamber 20 easily moves the valve ball 164 toward the right (as viewed in FIG. 5) to an open condition to enable fluid to flow past the ball and through the circular opening 140 to the annular cavity or passage 136 extending around the sleeve 128. The fluid then flows through the conduit 56 to the power steering control valve 28.

The check valve 114 and pressure modulation valve 110 are connected in parallel with each other and are connected in series with the power steering control valve 28 and power steering motor 12 in the manner illustrated schematically in FIG. 2. During expansion of the variable volume chamber 20, fluid can only flow through the pressure modulation valve 110 in the direction of the arrow 174. Fluid flow through the check valve 114 is blocked. During contraction of the motor chamber 20, fluid discharged from the power steering motor 12 can flow through the check valve 114 in the direction of the arrow 176. Fluid is blocked from flowing through the pressure modulation valve 110. Since the pressure modulation valve 110 is connected in series with the power steering control valve 28 and power steering motor 12 and acts directly on the motor fluid for the power steering motor 12, the pressure modulation valve 110 can respond quickly to variations in vehicle speed.

Although only the valve assembly 96 has been extensively discussed, it should be understood that the valve assembly 98 has the same construction as the valve assembly 96. Thus, the valve assembly 98 includes a pressure modulation valve 182 and a check valve 184

(FIGS. 2 and 4) of the same general construction as the pressure modulation valve 110 and check valve 114. The pressure modulation valve 182 is biased toward the closed condition by the piston 148 with a force which varies as a function of vehicle speed in the same manner as in which the pressure modulation valve 110 is biased toward the closed condition by the piston 146.

Operation

During operation of the power steering apparatus 10 to turn the vehicle when the vehicle is driven at a very low speed, such as during a parking maneuver, fluid pressure is transmitted from the power steering valve 28 through the pressure modulation valve 110 to the motor 12. At this time, the output from the auxiliary pump 86 is at a relatively low pressure. Therefore, the pressure modulation valve is readily actuated to the open condition shown in FIG. 6 and there is a very small or negligible pressure drop across the pressure modulation valve.

Figure 7:
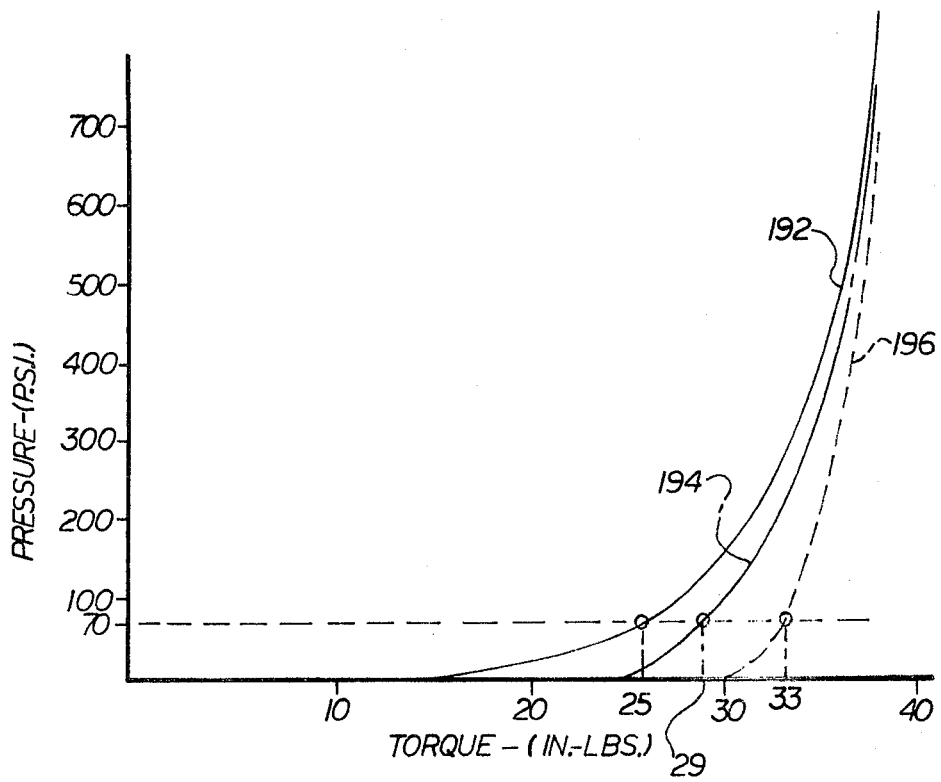
FIG. 7 is a graph depicting the relationship between torque applied to the power steering control valve by an operator of a vehicle and fluid pressure transmitted to the power steering motor at various vehicle speeds.

At low vehicle speeds the relationship between the torque applied to the torsion rod 66 in the power steering valve 28 (FIG. 3) and the fluid pressure transmitted to the expanding variable volume chamber 20 or 22 of the power steering motor 12 is in accordance with the curve 192 of the graph of FIG. 7. Thus to obtain a fluid pressure of approximately 70 pounds per square inch at the expanding power steering motor chamber 20 or 22 during a parking maneuver, the power steering control valve 28 is actuated with a torque of approximately 25 inch-pounds.

An increase in the torque applied to the power steering valve 28 by twisting the steering wheel 30 results in an increase in the fluid pressure transmitted to the pressure modulation assembly 48. This increased fluid pressure is transmitted, with a small reduction in pressure, to the expanding chamber of the power steering motor 12 in the manner indicated by the curve 192. Fluid discharged from the contracting variable volume chamber of the power steering motor 12 is discharged through the open check valve 184 (see FIG. 6). It should be noted that a relatively small input torque is required to initiate operation of the power steering motor 12 at low vehicle speeds.

When the vehicle is being driven at a moderate speed, the relationship between the torque required to actuate the power steering control valve 28 and the fluid pressure transmitted to the expanding chamber 20 or 22 of the power steering motor 12 is indicated by the curve 194 in FIG. 7. At moderate vehicle speeds, the fluid pressure transmitted to the steering motor 12 is less for a given extent of actuation of the power steering control valve 28 than at low vehicle speeds. The fluid pressure output from the power steering control valve 28 is the same for a given input torque and extent of operation of the control valve at low and moderate vehicle speeds. However, at moderate vehicle speeds, the pressure modulation assembly 48 effects a greater reduction in the output process from the control valve 28 than at low speeds.

Figure 6:
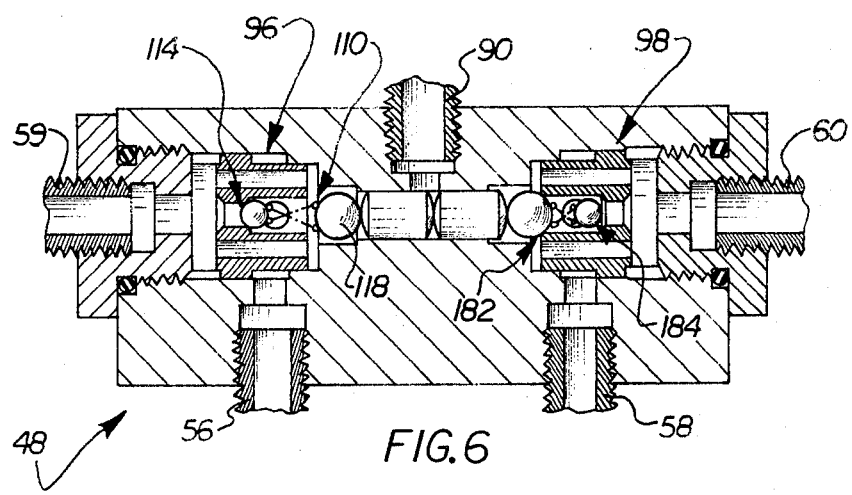
FIG. 6 is a sectional view, similar to FIG. 4, illustrating the pressure modulation assembly in an actuated condition during turning movement of steerable vehicle wheels.

Assuming a moderate speed turn in which the motor chamber 20 is expanded and the motor chamber 22 is being contracted, the pressure modulation valve 110 in the valve assembly 96 and the check valve 184 in the valve assembly 98 are open (FIG. 6). This allows fluid from the control valve 28 to be ported to the power steering motor 12 by the valve assembly 96. At the same time, fluid discharged from the power steering motor 12 is ported to the control valve 28 by the valve assembly 98.

Figure 4:
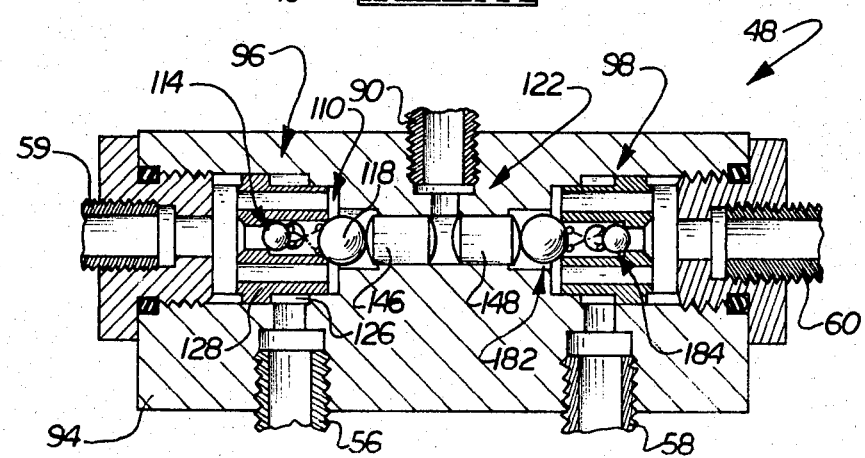
FIG. 4 is a sectional view illustrating the construction of the present modulation assembly, the pressure modulation assembly being shown in an unactuated condition.

At this time, the fluid pressure output from the auxiliary pump 86 causes the piston 146 to urge the pressure modulation valve 110 from the open condition of FIG. 6 toward the closed condition of FIG. 4. The biasing force applied by the piston 146 causes a reduction in the fluid pressure transmitted from the power steering valve 28 to the expanding motor chamber 20. This reduction in the fluid pressure transmitted to the power steering motor 12 results in an increase in the torque which is required by the operator to have a given pressure force transmitted to the expanding chamber 20 of the motor. Thus, in order to effect the transmission of 70 psi to the expanding chamber 20 of the power steering motor during turning movement of the vehicle at moderate speeds, a torque of approximately 29 inch-pounds would have to be applied to the power steering valve 28 (see FIG. 7).

When the vehicle is traveling at a still higher speed, the fluid pressure output from the auxiliary pump 86 is increased and the biasing force applied against the pressure modulation valve 110 by the piston 146 is increased. This results in an increase in the torque which must be applied to the power steering valve 28 to effect the transmission of the same fluid pressure to the expanding chamber 20 or 22 of the power steering motor 12. Thus, the relationship between the torque applied to the power steering valve 28 and the pressure transmitted to the expanding chamber of the power steering motor 12 varies in the manner indicated by the curve 196 in FIG. 7. At this time, in order to obtain a motor cylinder fluid pressure of 70 psi, a torque of approximately 33 inch-pounds must be applied to the power steering control valve 28.

It should be understood that the specific relationships set forth in FIG. 7 between torque and fluid pressure transmitted to the motor 12 may vary and that the shape of the curves 192, 194 and 196 may vary. The specific values set forth in regard to torque and fluid pressure have been for purposes of illustration rather than limitation of the invention. It should also be understood that although discrete curves 192, 194 and 196 have been shown in FIG. 7 as representative of specific incremental changes in the relationship between torque applied to the power steering valve 28 and fluid pressure transmitted to the expanding chamber 20 or 22 of the power steering motor 12, the relationship changes gradually with changes in vehicle speed. Thus, there is a smooth transition to higher steering effort as vehicle speed increases.

Having described one specific preferred embodiment of the invention, the following is claimed:

1. In an apparatus for use in turning steerable vehicle wheels, said apparatus comprising fluid motor means operable to effect turning movement of steerable vehicle wheels, said motor means including first and second variable volume chambers, and manually actuatable control valve means for directing fluid flow to said motor means upon actuation of said control valve means; the improvement comprising pressure modulation means connected to series fluid communication with said control valve means and said fluid motor means for reducing the pressure of the fluid from said control valve means to an extent which varies as a function of vehicle speed, for porting the fluid from said control valve means to said motor means at the reduced pressure to effect operation of said motor means under the influence of a fluid pressure force which varies in magnitude both as a function of the extent of actuation of the control valve means and as a function of vehicle speed, and for porting fluid from said motor means to said control valve means during operation of said motor means, said pressure modulation means includes a first valve assembly which is connected in series fluid communication with said first variable volume chamber and said control valve means and a second valve assembly which is connected in series fluid communication with said second variable volume chamber and said control valve means, said first valve assembly being operable to port fluid from said control valve means to said first variable volume chamber at the reduced pressure upon operation of said control valve means in a first direction and being operable to port fluid from said first variable volume chamber to said control valve means upon operation of said control valve means in a second direction, said second valve assembly being operable to port fluid from said control valve means to said second variable volume chamber at the reduced pressure upon operation of said control valve means in the second direction and being operable to port fluid from said second variable volume chamber to said control valve means upon operation of said control valve means in the first direction.

2. An apparatus as set forth in claim 1 wherein said pressure modulation means includes means for providing biasing pressure which varies as a function of variations in vehicle speed and means for applying to said first and second valve assemblies biasing forces which vary as a function of variations in the biasing pressure.

3. In an apparatus for use in turning steerable vehicle wheels, said apparatus comprising fluid motor means operable to effect turning movement of steerable vehicle wheels and manually actuatable control valve means for directing fluid flow to said motor means upon actuation of said control valve means, the improvement comprising pressure modulation means connected in series fluid communication with said control valve means and said fluid motor means for reducing the pressure of fluid from said control valve means to an extent which varies as a function of vehicle speed, for porting fluid from said control valve means to said motor means at the reduced pressure to effect operation of said motor means under the influence of a fluid pressure force which varies in magnitude both as a function of the extent of actuation of the control valve means and as a function of vehicle speed, and for porting fluid from said motor means to said control valve means during operation of said motor means, said pressure modulation means includes a passage through which fluid flows from said control valve means to said motor means, a valve member movable between a closed condition blocking fluid flow through said passage and an open condition in which said valve member is ineffective to block fluid flow through said passage, and pump means for providing an output pressure which urges said valve member toward the closed position with a force which varies as a function of vehicle speed, said valve member being movable from the closed condition to the open condition against the influence of the fluid output pressure from said pump means under the influence of fluid pressure transmitted from said control valve means to said valve member.

4. In an apparatus for use in turning steerable vehicle wheels, said apparatus comprising fluid motor means operable to effect turning movement of steerable vehicle wheels, said motor means including first and second variable volume chambers, and manually actuatable control valve means for directing fluid flow to said motor means upon actuation of said control valve means, said control valve means including first and second control valve ports, the improvement comprising pressure modulation means connected to series fluid communication with said control valve means and said fluid motor means for reducing the pressure of the fluid from said control valve means to an extent which varies as a function of vehicle speed, for porting the fluid from said control valve means to said motor means at the reduced pressure to effect operation of said motor means under the influence of a fluid pressure force which varies in magnitude both as a function of the extent of actuation of the control valve means and as a function of vehicle speed, and for porting fluid from said motor means to said control valve means during operation of said motor means, said pressure modulation means includes (a) first and second modulator ports each of which is connected in fluid communication with one of said control valve ports, (b) third and fourth modulator ports each of which is connected in fluid communication with one of said variable volume chambers, (c) first and second passage means connected in parallel fluid communication with said first and third modulator ports, (d) third and fourth passage means connected in parallel fluid communication with said second and fourth modulator ports, (e) first valve means operable between a closed condition blocking fluid flow through said first passage means and an open condition enabling fluid to flow through said first passage means from said first modulator port to said third modulator port, (f) second valve means operable between a closed condition blocking fluid flow through said second passage means and an open condition enabling fluid to flow through said second passage means from said third modulator port to said first modulator port, (g) third valve means operable between a closed condition blocking fluid flow through said third passage means and an open condition enabling fluid to flow through said third passage means from said second modulator port to said fourth modulator port, (h) fourth valve means operable between a closed condition blocking fluid flow through said fourth passage means and an open condition enabling fluid to flow through said fourth passage means from said fourth modulator port to said second modulator port, and (i) biasing means for urging said first and third valve means toward their closed conditions with a biasing force which varies as a function of the speed of the vehicle, said first valve means being operable from the closed condition to the open condition against the biasing force under the influence of fluid pressure transmitted from said first control valve port to said first modulator port to enable fluid to flow from said first control valve port through said first and third modulator ports to said first variable volume chamber to effect expansion of said first variable volume chamber and operation of said fluid motor means to turn the steerable vehicle wheels in a first direction, said second variable volume chamber contracting simultaneously with expansion of said first variable volume chamber to discharge fluid to said fourth modulator port, said third valve means being maintained in the closed condition by said biasing means to block fluid flow through said third passage means from said fourth modulator port to said second modulator port, said fourth valve means being opened under the influence of fluid pressure to enable fluid to flow from said fourth modulator port to said second modulator port through said fourth passage means, said third valve means being operable from the closed condition to the open condition against the biasing force under the influence of fluid pressure transmitted from said second control valve port to said second modulator port to enable fluid to flow from said second control valve port through said second and fourth modulator ports to said second variable volume chamber to effect expansion of said second variable volume chamber and operation of said fluid motor means to turn the steerable vehicle wheels in a second direction, said first variable volume chamber contracting simultaneously with expansion of said second variable volume chamber to discharge fluid to said third modulator port, said first valve means being maintained in the closed condition by said biasing means to block fluid flow through said first passage means from said third modulator port to said second modulator port, said second valve means being opened under the influence of fluid pressure to enable fluid to flow from said third modulator port to said fourth modulator port through said second passage means.

5. In an apparatus for use in turning steerable vehicle wheels, said apparatus comprising fluid motor means operable to effect turning movement of steerable vehicle wheels and manually actuatable control valve means connected in fluid communication with said motor means for directing fluid flow to said motor means upon actuation of said control valve means, the pressure of the fluid flowing to the motor means varying as a direct function of the extent of actuation of said control valve means and independent of vehicle speed, the improvement of pressure modulation means for modifying the pressure of the fluid from said control valve means to the motor means to an extent which varies as a function of vehicle speed, said pressure modulation means including a valve assembly having an inlet through which the fluid output from said control valve means enters said valve assembly, an outlet through which fluid leaves said valve assembly and is conducted to said fluid motor means, and variable size orifice means through which fluid passes in flowing from said inlet to said outlet, said pressure modulation means further including means for varying the size of said orifice means as a function of vehicle speed.

6. An apparatus for use in turning steerable vehicle wheels, said apparatus comprising fluid motor means operable to effect turning movement of steerable vehicle wheels, said fluid motor means having first and second variable volume chambers, and manually actuatable control valve means for directing fluid flow to said motor means upon actuation of said control valve means, the improvement comprising pressure modulation means for reducing the pressure of the fluid from said control valve means to an extent which varies as a function of vehicle speed, said pressure modulation means including first variable size orifice means through which fluid flows from said control valve means to said first variable volume chamber upon operation of said control valve means from an initial condition to a first actuated condition, second variable size orifice means through which fluid flows from said control valve means to said second variable volume chamber upon operation of said control valve means from the initial condition to a second actuated condition, and means for varying the size of said first orifice means as a function of vehicle speed when said control valve means is in the first actuated condition and for varying the size of said second orifice means as a function of vehicle speed when said control valve means is in the second actuated condition.

* * * * *

UNITED STATES PATENT AND TRADEMARK OFFICE
CERTIFICATE OF CORRECTION

PATENT NO. : 4,410,058

DATED : October 18, 1983

INVENTOR(S) : Richard Warren Dymond

It is certified that error appears in the above-identified patent and that said Letters Patent are hereby corrected as shown below:

Column 10, line 7 change "to" to -- in --.

Signed and Sealed this

Tenth Day of January 1984

[SEAL]

Attest:

GERALD J. MOSSINGHOFF

Attesting Officer

Commissioner of Patents and Trademarks